Sept. 25, 1951     L. J. MARRIER     2,568,815
TRUSS
Filed May 13, 1949
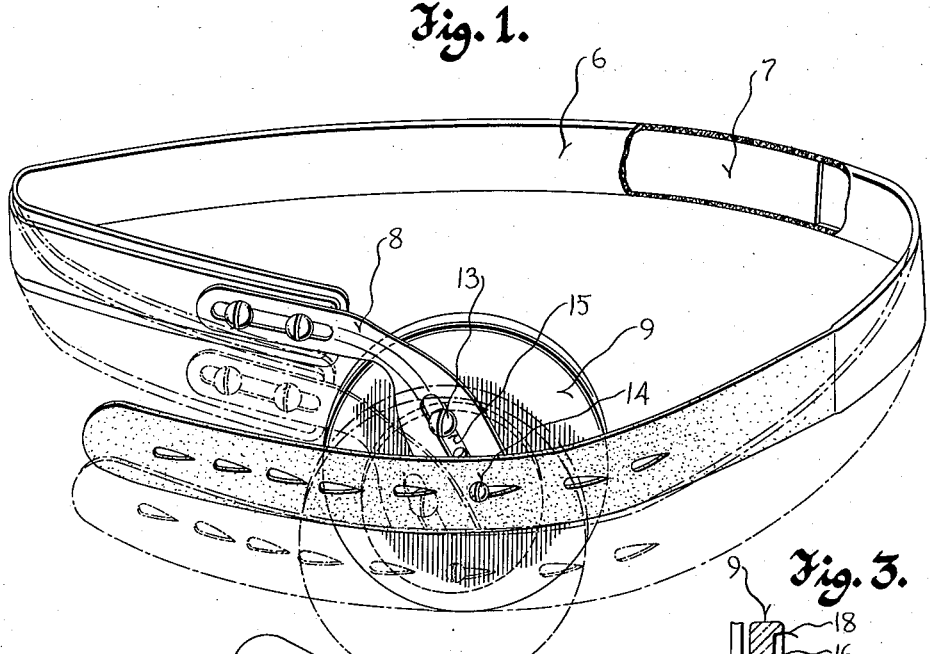
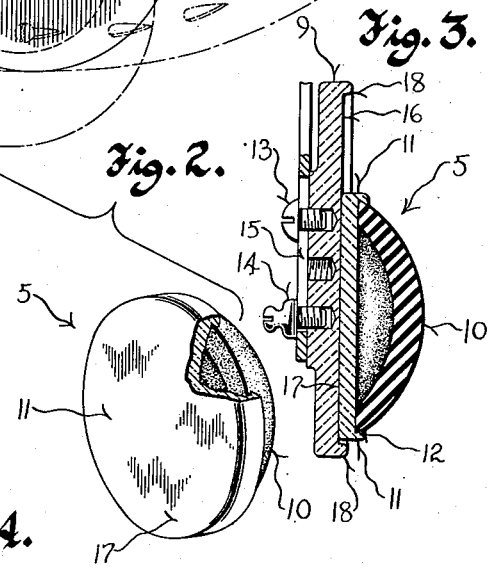
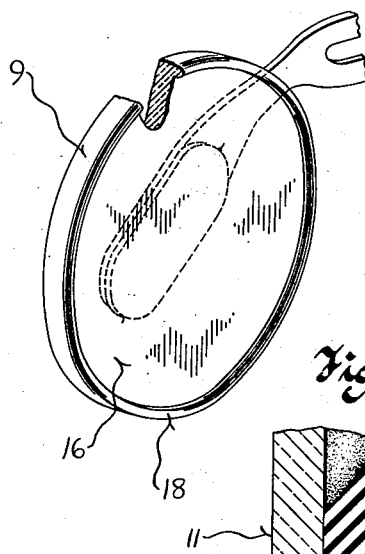
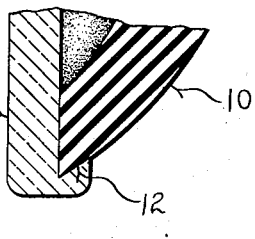

Patented Sept. 25, 1951

2,568,815

UNITED STATES PATENT OFFICE 2,568,815

TRUSS

Leo J. Marrier, Milwaukee, Wis.

Application May 13, 1949, Serial No. 93,033

9 Claims. (Cl. 128—117)

This invention relates to trusses and refers particularly to a rupture truss.

One of the most serious disadvantages of rupture trusses heretofore available is that the plug which fits into the rupture cavity was often dislodged by the inevitable shifting of the truss harness as a result of body movements. In an effort to correct this deficiency trusses have been provided with a swivel-like connection between the plug and that part of the carrying harness through which pressure is applied on the plug. While such a swivel connection, of course, allows the plug to rock with respect to the harness it obviously does not accommodate bodily shifting of the harness with respect to the plug and, as a result, the plug was often dislodged from the rupture cavity notwithstanding the swivel connection.

It is, therefore, the purpose of this invention to correct this deficiency of rupture trusses by so constructing the same that the pressure applying portion of the harness has a relatively large degree of free movement transversely of the plug so that shifting of the harness due to normal body movements will not dislodge the plug.

More specifically it is an object of this invention to provide a truss in which the pressure applying member of the harness has a free sliding connection with the plug so that shifting of the pressure applying member with body movements merely results in a sliding of this part of the holding harness across the plug without dislodging the same or disturbing its proper position in the body cavity.

Another object of this invention is to provide a truss in which the plug is freely separable from the holding harness.

Still another object of this invention is to provide a plug for rupture trusses which consists of a resilient body portion and a solid backing disc readily separably held together so as to permit disassembly of the parts for cleaning.

With the above and other objects in view which will appear as the description proceeds, this invention resides in the novel combination, construction and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a perspective view of a truss embodying this invention;

Figure 2 is a perspective view of the plug and the pressure applying member by which the plug is held against the body of the wearer, said parts being shown disassembled and having portions thereof broken away and shown in section;

Figure 3 is a transverse sectional view through the assembled plug and pressure applying member; and Figure 4 is a detail sectional view through a portion of the plug on an enlarged scale to show the manner in which the plug body and its backing disc are held assembled.

Referring now particularly to the accompanying drawing, the numeral 5 designates the plug of the truss which is adapted to be held in place in a rupture cavity by means of a harness including a belt 6. The belt 6 fits about the waist of the wearer and, as is customary, has a metal insert 7 extending for part of its length. A metal arm 8 projects from one end of this insert and has a pressure applying member 9 fixed thereto to overlie and press against the plug.

The plug 5 consists of a body 10 of rubber or other similar resiliently yieldable material and a backing disc 11 made of metal or a suitable plastic. The body 10 is substantially cup-shaped with a spherical front face and a flat back which fits against the inner face of the backing disc where it is readily detachably held by an undercut marginal flange 12. This manner of connecting the body with its backing disc permits these parts to be quickly disassembled for cleaning.

The pressure applying member 9 is substantially larger in diameter than the backing disc 11 and is detachably secured to the metal arm 8 by screws 13 and 14, the latter providing a knoblike post with which the notches in the belt engage. Adjustment of the pressure applying member 9 lengthwise of the arm 8 is permitted by virtue of the fact that the aperture 15 in the arm 8 through which the screws 13 and 14 pass is an elongated slot.

The surface 16 of the pressure applying member 9 which faces the body of the wearer is smooth as is also the outer surface 17 of the backing disc 11 so that these two surfaces are freely slidable over each other. Consequently, though the pressure applying member 9 inevitably shifts as a result of body movements such shifting thereof caused by normal body movements in nowise disturbs the location of the plug 5. Also such shifting of the pressure applying member does not affect the pressure with which the plug is held in place.

The extent of relative shifting between the pressure applying member and the plug (as shown in broken lines in Figure 1) is defined by a marginal rim 18 projecting up from the smooth surface 16.

As will be readily apparent this invention corrects one of the most serious disadvantages of rupture trusses heretofore available in that it enables the carrying harness to shift with body movements without dislodging the plug from its proper place in the rupture cavity.

It will also be readily apparent that the truss of this invention is far more sanitary than trusses heretofore available since all parts thereof, including the plug itself, are quickly and easily disassembled to permit thorough cleaning.

What I claim as my invention is:

1. In a truss of the type to be worn by ruptured persons: a plug to fit against the ruptured portion of the wearer's body; and means adapted to be strapped to the wearer's body for holding the plug in place, said means being characterized by the provision of a pressure applying member larger than the plug and bearing against the plug with a free sliding engagement which enables substantial shifting of the pressure applying member across the plug so that such shifting of the pressure applying member due to normal body movements does not dislodge the plug from its proper place on the body of the wearer.

2. In a rupture truss: a plug adapted to fit into a rupture cavity, said plug having a smooth outer face on the side opposite the portion thereof engaged in the rupture cavity; means for holding the plug in place including a pressure applying member having a smooth face slidably engaging the smooth outer face of the plug so that said pressure applying member may slide freely across the outer face of the plug; and means for limiting the extent of such sliding motion.

3. In a rupture truss: a plug adapted to fit into a rupture cavity; and means for holding the plug in place including a pressure applying member, said pressure applying member having a smooth surface facing the plug, and the plug having a smooth surface facing and engaging said smooth surface of the pressure applying member, said smooth surfaces being freely slidable across each other so that the pressure applying member may shift without dislodging the plug and without minimizing the pressure maintained thereby on the plug.

4. In a truss, the structure set forth in claim 3 further characterized by the fact that the pressure applying member is a smooth faced disc substantially larger in diameter than the plug, and that the smooth face of the plug is provided by a smooth faced backing disc to which the plug is attached.

5. In a truss, the structure set forth in claim 4 further characterized by the provision of a rim around the edge of the pressure applying member for limiting relative shifting between the pressure applying member and the plug.

6. In a truss of the character described: a belt adapted to be strapped to the body of a wearer; a pressure applying member carried by the belt and adapted to be drawn thereby toward the body of the wearer, said pressure applying member having a smooth surface to face the body of the wearer; a plug adapted to fit into a rupture cavity; and a backing disc for the plug slidably seated on said smooth surface of the pressure applying member, the free sliding engagement between the pressure applying member and backing disc allowing the pressure applying member to move edgewise across the backing disc without disturbing the position of the plug; and means for limiting the extent of such relative shifting between the pressure applying member and said backing disc.

7. The truss set forth in claim 6 further characterized by the fact that the pressure applying member is substantially larger than the backing disc and that the means for limiting relative shifting between the pressure applying member and backing disc comprises a rim around the edge of the pressure applying member.

8. In a rupture truss of the type having a belt adapted to be secured about the wearer, a rigid arm projecting from the belt and a plug adapted to be placed against the ruptured portion of the wearer's body; means for holding the plug in place on the body of the wearer, comprising a pressure applying member adjustably secured to said rigid arm; and cooperating slidingly engaging surfaces on the plug and the pressure applying member providing a freely slidable connection therebetween whereby the pressure member is freely shiftable with respect to the plug and permits body movement which results in movement of the pressure applying member without dislodging the plug from its proper place on the body of the wearer.

9. A truss of the character described, comprising: a harness adapted to be strapped to a wearer's body; a pressure applying member mounted on the harness and adapted to be drawn thereby toward the wearer's body over the ruptured portion; a plug entirely separate from the pressure applying member and adapted to be placed against the ruptured portion; and a freely sliding pressure applying connection between the pressure applying member and the plug constituting the sole support for the plug other than the wearer's body and by which the plug is pressed against the ruptured portion in a manner allowing substantial transverse shifting of the pressure applying member with respect to the plug and the ruptured portion engaged thereby

LEO J. MARRIER.

REFERENCES CITED

The following references are of record in the file of this patent:

UNITED STATES PATENTS

| Number | Name | Date |
|---|---|---|
| 456,823 | House | July 28, 1891 |
| 462,015 | Nagler | Oct. 27, 1891 |
| 947,551 | Fosgate | Jan. 25, 1910 |
| 1,051,325 | Haile | Jan. 21, 1913 |
| 1,907,300 | Lowe | May 2, 1933 |
| 2,422,894 | Grubb | June 24, 1947 |

FOREIGN PATENTS

| Number | Country | Date |
|---|---|---|
| 859,183 | France | May 27, 1940 |